United States Patent
Kobayashi et al.

[11] Patent Number: 5,923,549
[45] Date of Patent: Jul. 13, 1999

[54] X-RAY HIGH VOLTAGE GENERATOR PROTECTED AGAINST FAULT BY BACKUP SYSTEM

[75] Inventors: Hiroyoshi Kobayashi; Manabu Netsu, both of Tochigi, Japan

[73] Assignee: Kabushiki Kaisha Toshiba, Kawasaki, Japan

[21] Appl. No.: 08/893,758

[22] Filed: Jul. 11, 1997

Related U.S. Application Data

[30] Foreign Application Priority Data

Jul. 12, 1996 [JP] Japan ..................................... 8-183532

[51] Int. Cl.⁶ .................................................. H02M 3/335
[52] U.S. Cl. .................................. 363/65; 363/17; 363/37
[58] Field of Search .................................. 363/17, 37, 65, 363/71, 98, 132

[56] References Cited

U.S. PATENT DOCUMENTS

| 4,860,188 | 8/1989 | Bailey et al. | 363/65 |
|---|---|---|---|
| 4,947,310 | 8/1990 | Kawabata et al. | 363/71 |
| 5,319,536 | 6/1994 | Malik | 363/65 |
| 5,428,523 | 6/1995 | McDonnal | 363/71 |
| 5,446,645 | 8/1995 | Shirahama et al. | 363/71 |
| 5,737,202 | 4/1998 | Shimamori | 363/65 |

FOREIGN PATENT DOCUMENTS 64-86497   3/1989   Japan .
5-82286    4/1993   Japan .

Primary Examiner—Jeffrey Sterrett
Attorney, Agent, or Firm—Oblon, Spivak, McClelland, Maier & Neustadt, P.C.

[57] ABSTRACT

A second inverter portion having a similar configuration to a first inverter portion is connected in parallel with the first inverter portion which consists of an inverter circuit and an inverter driving circuit. If an inverter current detector detects abnormality of an electric current flowing through the inverter circuits in use of the first inverter circuit, use of the second inverter portion is allowed by switching a switch.

6 Claims, 7 Drawing Sheets

X-RAY HIGH VOLTAGE GENERATOR PROTECTED AGAINST FAULT BY BACKUP SYSTEM

BACKGROUND OF THE INVENTION

1. Field of the Invention

The present invention relates to an X-ray high voltage generator and, more particularly, an X-ray high voltage generator used in a medical X-ray system and capable of promoting the safety of patients.

2. Description of the Prior Art

In recent years, as an X-ray high voltage generator for use in a medical X-ray system, an inverter type X-ray high voltage generator employing high power semiconductor devices has been spread with rapidity. As features of such inverter type X-ray high voltage generator, space saving due to reduction in size and weight of the high voltage generator which can be attained by making its working frequency higher, and higher efficiency which can be attained because X-ray tube voltage waveform, which is similar to a constant voltage, can be achieved by using either a single phase power supply or a three phase power supply may be considered.

FIG. 1 is a block circuit diagram showing an example of the inverter type X-ray high voltage generator for use in the medical X-ray system in the prior art.

As shown in FIG. 1, alternating current (AC) electric power supplied from the commercial power supply is rectified/smoothed by a full-wave rectifier 102 and a capacitor 103 into direct current (DC) electric power, and then supplied to an inverter circuit 104 which comprises high power semiconductor devices (high speed and large power switching devices). A fuse 105 is inserted to one end of the input side of the inverter circuit 104, and a current detector 106 is inserted to the other end of the inverter circuit 104.

DC electric power is converted into high frequency AC power (e.g., 10 kHz) by the inverter circuit 104, then a voltage of the high frequency AC power is increased into AC high voltage (e.g., 100 kV) by a high voltage transformer 107, then the AC high voltage is smoothed to DC high voltage (e.g., 140 kV) by a capacitor 109 and a high voltage rectifier 108 which is formed of silicon rectifier with a breakdown voltage of about 150 kV, etc., and then such DC high voltage is applied to an X-ray tube 110. A voltage dividing resistor 111 is connected in parallel with the capacitor 109. As a detection value of a tube voltage (i.e., detection value corresponding to the applied voltage to the X-ray tube), a voltage across the voltage dividing resistor 111 is fed back to an inverter driving circuit 112 which controls switching timing of the inverter circuit 104.

To the inverter driving circuit 112 are input a detection value of the inverter current detector 106, the detection value of the tube voltage, and a set value of the tube voltage and a set value (exposure time) of a timer, both being input respectively via a console (not shown) of the X-ray system.

In addition, an output of the inverter driving circuit 112 can drive four high speed and large power switching transistors constituting the inverter circuit 104.

However, there have been following disadvantages in the X-ray high voltage generator in the prior art.

More particularly, if any trouble of the inverter circuit 104 is caused, X-ray output from the X-ray tube 110 is interrupted to thus interfere with patient's diagnosis.

In particular, in the X-ray high voltage generator for use in a diagnostic system for the circulatory system, if the X-ray output is interrupted during catheter manipulation by the surgeon in operation, it becomes difficult for the surgeon to manipulate such catheter. As a result, danger to the subject (patient) would be increased and occasionally a subject's life-threatening situation would be brought about.

SUMMARY OF THE INVENTION

Therefore, it is an object of the present invention to provide an X-ray high voltage generator capable of preventing an output of an X-ray tube from being interrupted during diagnosis of the patient.

In order to achieve the above object, according to an aspect of the present invention, there is provided an X-ray high voltage generator comprising: a rectifying/smoothing circuit for rectifying/smoothing an alternating current supplied from an alternating current power supply to convert into a direct current; a first inverter circuit for converting the direct current supplied from the rectifying/smoothing circuit into high frequency alternating current; first inverter driving means for controlling the first inverter circuit; a second inverter circuit for converting the direct current supplied from the rectifying/smoothing circuit into high frequency alternating current; second inverter driving means for controlling the second inverter circuit; a transformer for increasing a high frequency alternating current voltage output supplied from the first inverter circuit or the second inverter circuit; a rectifier for rectifying an output of the transformer and supplying it to an X-ray tube; a first abnormality detecting means for detecting abnormality of the first inverter circuit; and switching means for disconnecting the transformer from the first abnormality detecting means and connecting the transformer to the second abnormality detecting means when the first abnormality detecting means detects abnormality.

In the preferred embodiment of the present invention, the first abnormality detecting means includes first current detecting means for detecting an electric current flowing through the first inverter circuit.

According to the present invention, if the first abnormality detecting means detects abnormality (such as current abnormality) when the first inverter circuit is in operation, the switching means can switch to operate the second inverter circuit instead of the first inverter circuit. In this manner, since the second inverter circuit is driven immediately in place of the first inverter circuit even if any trouble occurs in the first inverter circuit, such trouble never brings about danger on the patient in operation, for example.

According to another aspect of the present invention, there is provided an X-ray high voltage generator comprising: a rectifying/smoothing circuit for rectifying/smoothing an alternating current supplied from an alternating current power supply to convert into a direct current; a first inverter portion/high voltage converting portion including a first inverter circuit for converting the direct current supplied from the rectifying/smoothing circuit into high frequency alternating current, first inverter driving means for controlling the first inverter circuit, a first transformer for increasing a high frequency alternating current voltage output supplied from the first inverter circuit, and a first rectifier for rectifying an output of the first transformer and supplying the rectified output to an X-ray tube; a second inverter portion/high voltage converting portion including a second inverter circuit for converting the direct current supplied from the rectifying/smoothing circuit into high frequency alternating current, second inverter driving means for controlling the second inverter circuit, a second transformer for increasing a high frequency alternating current voltage output supplied from the second inverter circuit, and a second rectifier for rectifying an output of the second transformer and supplying the rectified output to the X-ray tube; a first abnormality detecting means for detecting abnormality of the first inverter portion/high voltage converting portion; and switching means for disconnecting the X-ray tube from the first inverter portion/high voltage converting portion and connecting the X-ray tube to the second inverter portion/high voltage converting portion when the first abnormality detecting means detects abnormality.

In the preferred embodiment of the present invention, the first abnormality detecting means includes at least one of a first current detecting means for detecting an electric current flowing through the first inverter circuit and a first voltage detecting means for detecting an output voltage of the first rectifier.

According to the present invention, if the first abnormality detecting means detects abnormality (such as current abnormality or voltage abnormality) when the first inverter portion/high voltage converter portion is in operation, the switching means may switch to operate the second inverter portion/high voltage converter portion instead of the first inverter portion/high voltage converter portion. In this fashion, since the second inverter portion/high voltage converter portion is driven immediately instead of the first inverter portion/high voltage converter portion even if any trouble occurs in the first inverter portion/high voltage converter portion, such trouble in no means brings about danger on the patient in operation, for example.

According to still another aspect of the present invention, there is provided an X-ray high voltage generator comprising: a rectifying/smoothing circuit for rectifying/smoothing an alternating current supplied from an alternating current power supply to convert into a direct current; a first inverter portion/high voltage converting portion including a first inverter circuit for converting the direct current supplied from the rectifying/smoothing circuit into high frequency alternating current, a first transformer for increasing a high frequency alternating current voltage output supplied from the first inverter circuit, and a first rectifier for rectifying an output of the first transformer and supplying the rectified output to an X-ray tube; a second inverter portion/high voltage converting portion including a second inverter circuit for converting the direct current supplied from the rectifying/smoothing circuit into high frequency alternating current, a second transformer for increasing a high frequency alternating current voltage output supplied from the second inverter circuit, and a second rectifier for rectifying an output of the second transformer and supplying the rectified output to the X-ray tube; and inverter driving/abnormality detecting/switching means for controlling the first inverter or the second inverter, and for disconnecting the X-ray tube from the first inverter portion/high voltage converting portion and connecting the X-ray tube to the second inverter portion/high voltage converting portion when abnormality of the first inverter portion/high voltage converting portion is detected.

In the preferred embodiment of the present invention, the inverter driving/abnormality detecting/switching means includes at least one of a first current detecting means for detecting an electric current flowing through the first inverter circuit and a first voltage detecting means for detecting an output voltage of the first rectifier.

According to the present invention, if the inverter driving/abnormality detecting/switching means detects abnormality (such as current abnormality) when the first inverter portion/high voltage converter portion is in operation, for example, it may switch to operate the second inverter portion/high voltage converter portion instead of the first inverter portion/high voltage converter portion. In this manner, since the second inverter portion/high voltage converter portion is driven immediately in place of the first inverter portion/high voltage converter portion even if any trouble occurs in the first inverter portion/high voltage converter portion, such trouble never brings about danger on the patient in operation, for example.

The nature, principle and utility of the invention will become more apparent from the following detailed description when read in conjunction with the accompanying drawings.

DESCRIPTION OF THE PREFERRED EMBODIMENTS

Embodiments of the present invention will be explained with reference to the accompanying drawings hereinafter.

(1) First Embodiment

Figure 1:
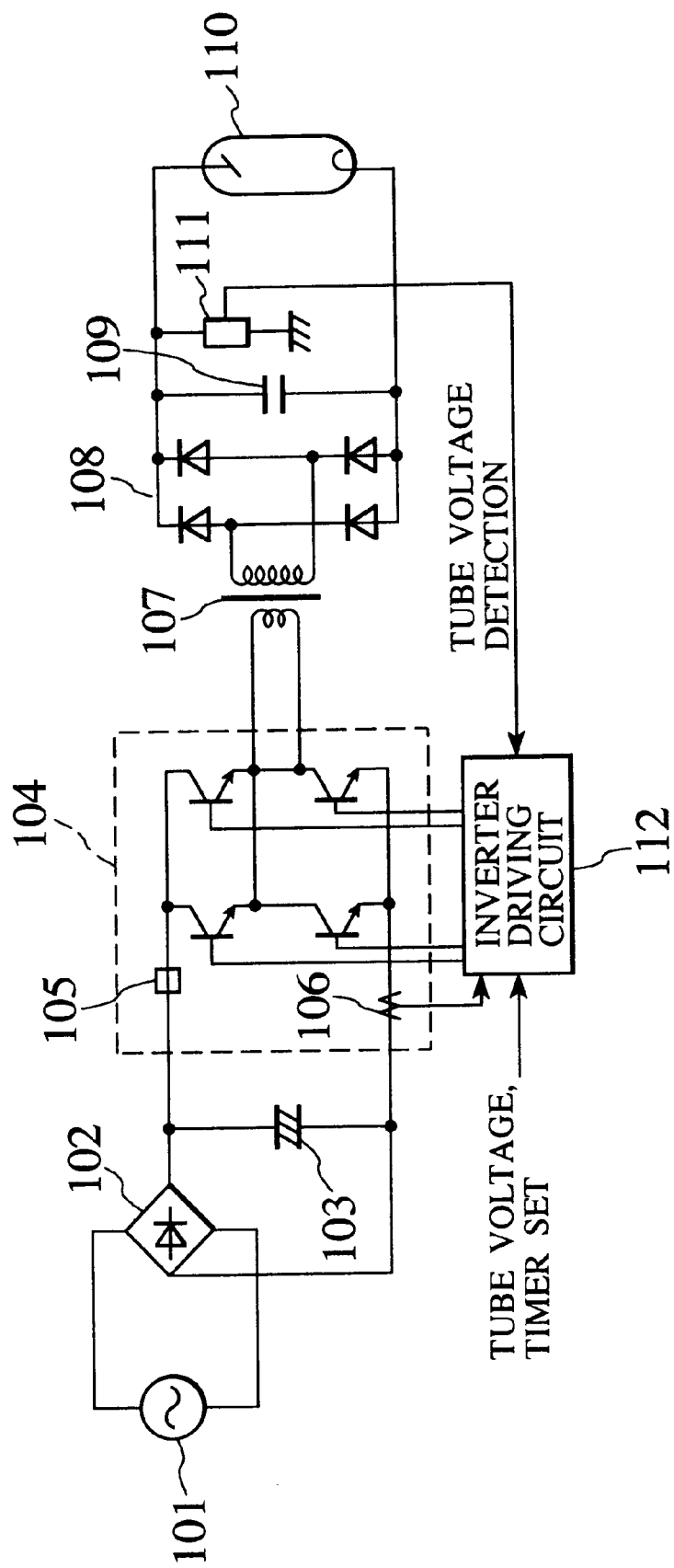
FIG. 1 is a block circuit diagram showing an X-ray high voltage generator in the prior art.
Figure 2:
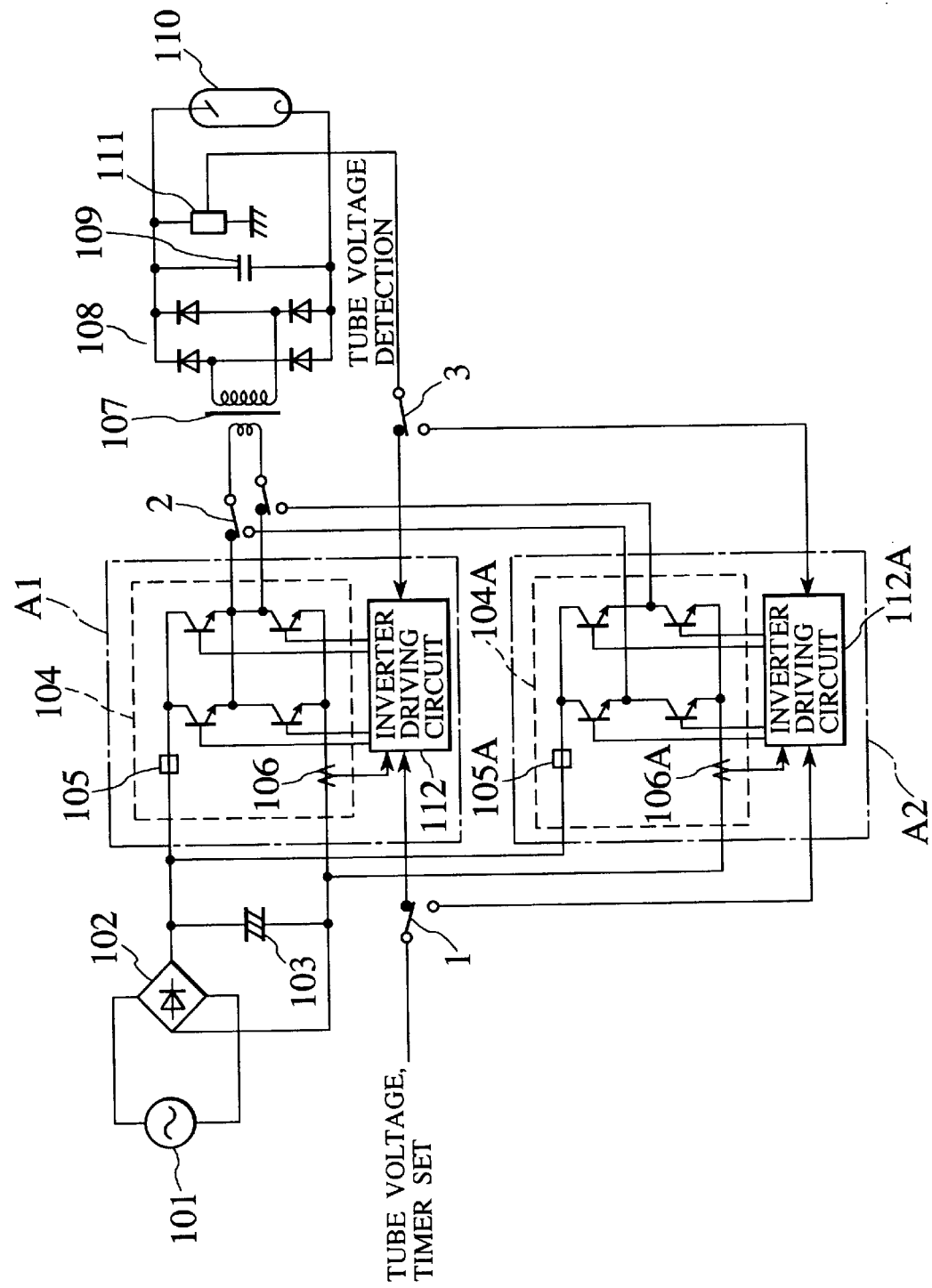
FIG. 2 is a block circuit diagram showing an X-ray high voltage generator according to a first embodiment of the present invention.

FIG. 2 is a block circuit diagram showing an X-ray high voltage generator according to a first embodiment of the present invention.

As shown in FIG. 2, in the first embodiment, a second inverter portion A2 consisting of an inverter circuit 104A and an inverter driving circuit 112A is provided in parallel with a first inverter portion A1 consisting of an inverter circuit 104 and an inverter driving circuit 112.

More particularly, AC power supplied from a commercial power supply 101 is rectified/smoothed to DC power by a full-wave rectifier 102 and a capacitor 103, and the DC power is then supplied to an inverter circuit 104 and an inverter circuit 104A, both having high power semiconductor devices (high speed and large power switching devices). A fuse 105 and a fuse 105A are inserted to respective one input ends of the inverter circuit 104 and the inverter circuit 104A. A current detector 106 and a current detector 106A are also inserted to respective other ends of the inverter circuit 104 and the inverter circuit 104A.

DC power is converted into high frequency AC power (e.g., 10 kHz) by the inverter circuit 104 and the inverter circuit 104A. A voltage of the high frequency AC power is then increased to an AC high voltage (e.g., 100 kV) by a high voltage transformer 107 via a second switch 2. The AC high voltage is then smoothed to DC high voltage (e.g., 140 kV) by a capacitor 109 and a high voltage rectifier 108 which is formed of a silicon rectifier with a breakdown voltage of about 150 kV, etc. The DC high voltage is then applied to an X-ray tube 110. A voltage dividing resistor 111 is connected in parallel with the capacitor 109. A voltage across the voltage dividing resistor 111 is fed back selectively to an inverter driving circuit 112 and an inverter driving circuit 112A via a third switch 3 as the detection value of the tube voltage (detection value corresponding to the applied voltage to the X-ray tube). The inverter driving circuit 112 and an inverter driving circuit 112A control respective switching timings of the inverter circuit 104 and the inverter circuit 104A respectively.

To the inverter driving circuit 112 are input the detection value of the inverter current detector 106, the detection value of the tube voltage, and a set value of the tube voltage and a set value (exposure time) of a timer, both being input from a console (not shown) of the X-ray system via a first switch 1 respectively.

To the inverter driving circuit 112A are input a detection value of the inverter current detector 106A, the detection value of tube voltage, and the set value of the tube voltage and the set value (exposure time) of the timer, both being input from the console of the X-ray system via the first switch 1 respectively.

An output of the inverter driving circuit 112 can drive four high speed and large power switching transistors constituting the inverter circuit 104. An output of the inverter driving circuit 112A can also drive four high speed and large power switching transistors constituting the inverter circuit 104A.

With respect to the first switch 1, the second switch 2, and the third switch 3, a signal line for propagating the tube voltage and the set value of the timer is connected to a stationary contact of the first switch 1. First and second change-over contacts of the first switch 1 are connected to the inverter driving circuit 112 and the inverter driving circuit 112A respectively.

One output end of the inverter circuit 104 in the first inverter portion A1 is connected to a first change-over contact of the second switch 2, and the other output end of the inverter circuit 104 is connected to a third change-over contact of the second switch 2. One output end of the inverter circuit 104A in the second inverter portion A2 is connected to a second change-over contact of the second switch 2, and the other output end of the inverter circuit 104A is connected to a fourth change-over contact of the second switch 2. First and second stationary contacts of the second switch 2 are connected to the primary side of the high voltage transformer 107.

A stationary contact of the third switch 3 is connected to the voltage dividing resistor 111. First and second change-over contacts of the third switch 3 are connected to the inverter driving circuit 112 and the inverter driving circuit 112A respectively.

Next, an operation of the X-ray high voltage generator according to the first embodiment will be explained hereunder.

For purposes of example, assume that the first switch 1, the second switch 2, and the third switch 3 are set in the situation illustrated in FIG. 2 and the X-ray high voltage generator is in use in such situation. In this case, the first inverter portion A1 is operated and then X-rays are irradiated from the X-ray tube 110 to the patient (not shown).

If a failure of the inverter circuit 104 is caused, a detection current flowing through the inverter current detector 106 is varied. In compliance with such detection current, the inverter driving circuit 112 which serves as one constituent element of abnormality detecting means may decide that any trouble is caused in the inverter circuit 104. According to this decision result, the inverter driving circuit 112 operates the first switch 1, the second switch 2, and the third switch 3 at the same time to switch the connection from the first inverter portion A1 to the second inverter portion A2. In response to this switching, a predetermined tube voltage is applied to the X-ray tube 110 via the second inverter portion A2.

Figure 3:
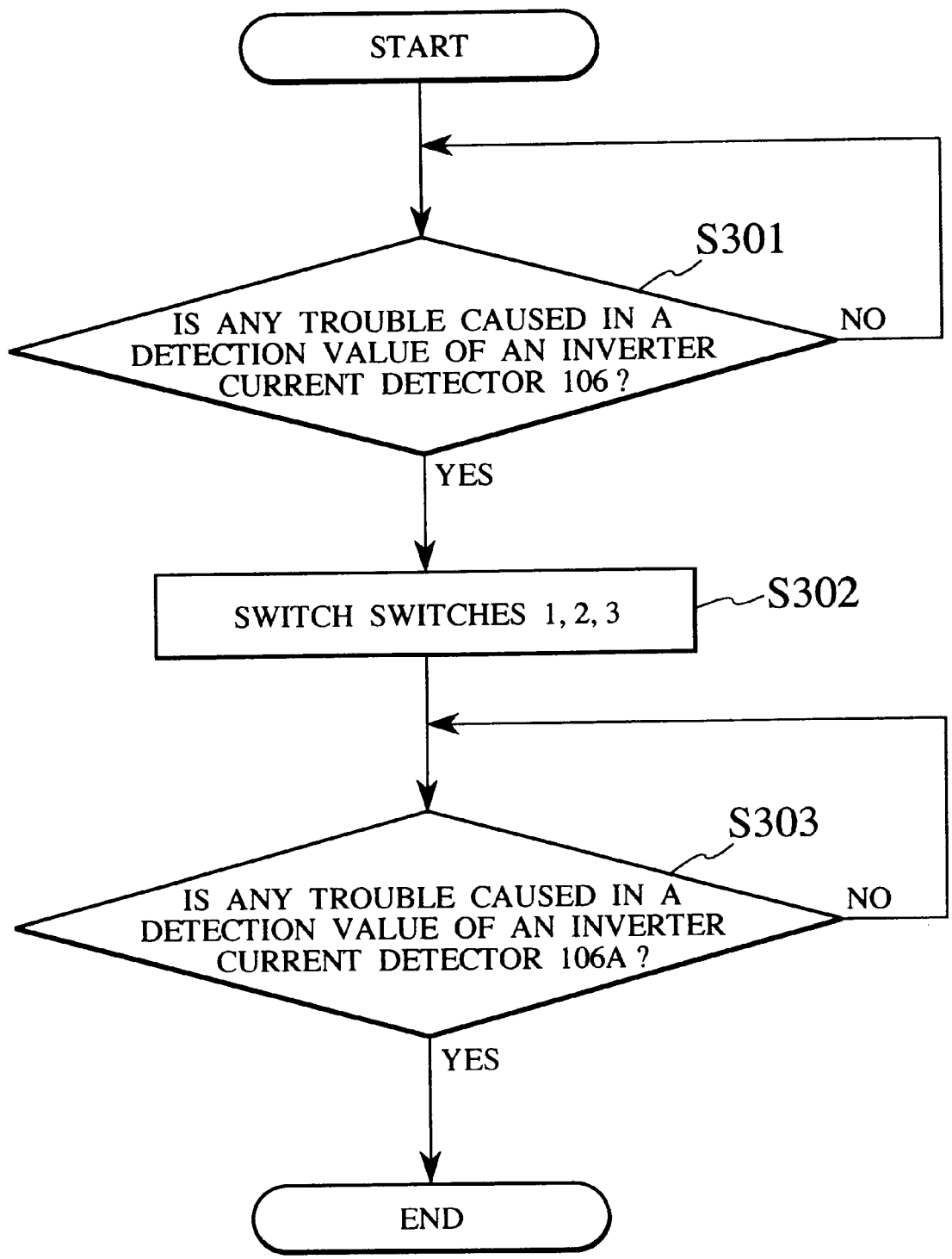
FIG. 3 is a flowchart illustrative of switching operation procedures in the first embodiment of the present invention.

More particularly, switching operation procedures in the first embodiment of the present invention are shown in FIG. 3 as a flowchart. At first, if there is any abnormality in the detection value of the inverter current detector 106 in operation of the first inverter portion A1 (step 301), the first switch 1, the second switch 2, and the third switch 3 are switched to operate the second inverter portion A2 (step 302). Then, if any abnormality occurs in the detection value of the inverter current detector 106A in operation of the second inverter portion A2 (step 303), the X-ray high voltage generator stops its operation.

As explained above, even if the X-ray high voltage generator has trouble in the first inverter portion A1, such trouble can be detected so that the connection can be switched immediately from the first inverter portion A1 to the second inverter portion A2. Hence, X-ray exposure from the X-ray tube 110 to the patient is in no way interrupted and thus such trouble exerts no harmful influence (damage) on the patient.

(2) Second Embodiment

In contrast to the first embodiment wherein only the inverter portions are connected in parallel with each other, both the inverter portions and the high voltage converters are connected together in parallel in the second embodiment.

Figure 4:
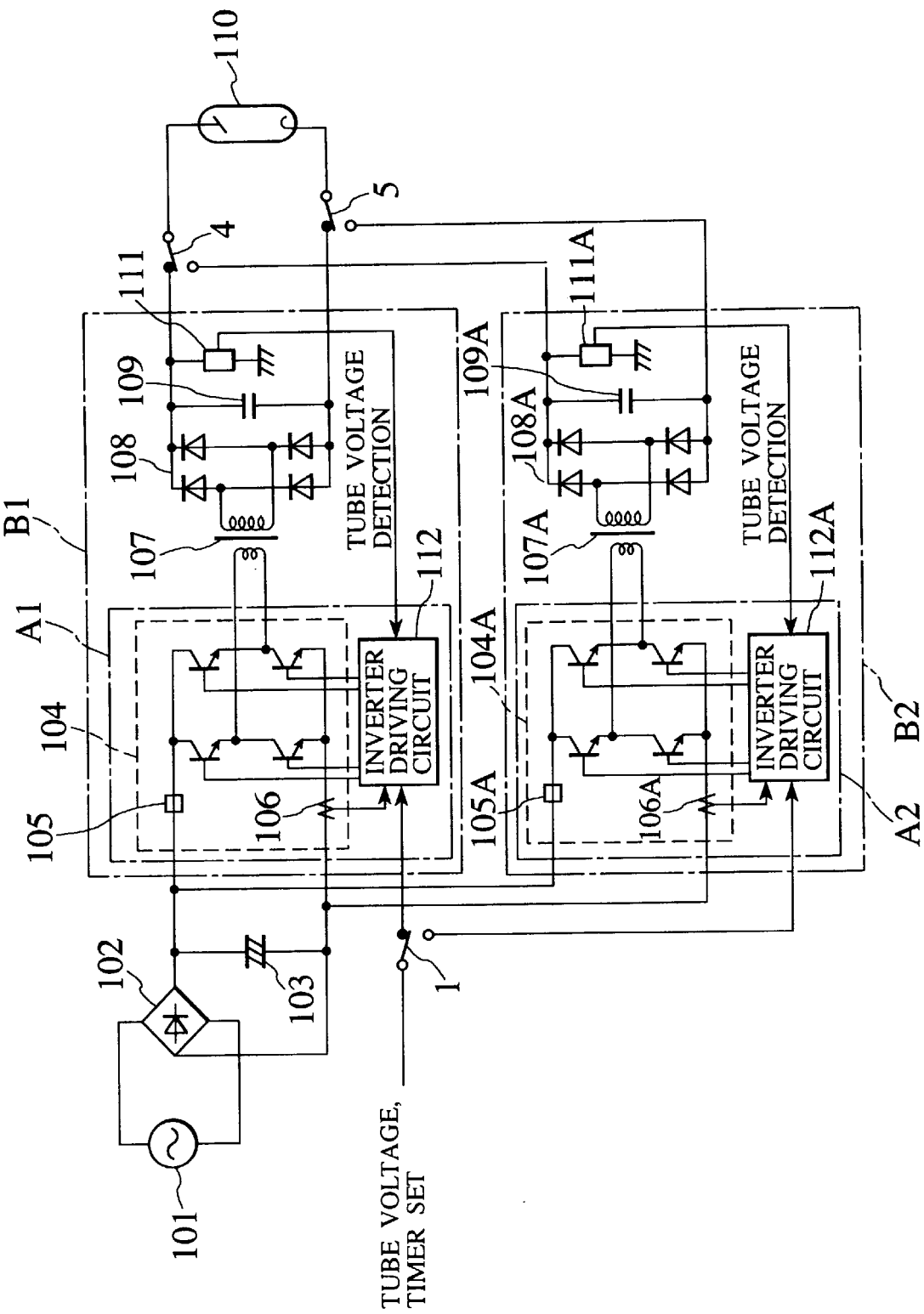
FIG. 4 is a block circuit diagram showing an X-ray high voltage generator according to a second embodiment of the present invention.

FIG. 4 is a block circuit diagram showing an X-ray high voltage generator according to the second embodiment of the present invention.

A first inverter portion/high voltage converter portion B1 is constituted by adding the high voltage transformer 107, the high voltage rectifier 108, the high voltage capacitor 109, and the voltage dividing resistor 111 to the first inverter portion A1. A second inverter portion/high voltage converter portion B2 is connected in parallel with the first inverter portion/high voltage converter portion B1. The second inverter portion/high voltage converter portion B2 is made up of the high voltage transformer 107A, the high voltage rectifier 108A, the high voltage capacitor 109A, and the voltage dividing resistor 111A in addition to the second inverter portion A2.

One output end of the first inverter portion/high voltage converter portion B1 is connected to a first change-over contact of a fourth switch 4, and the other output end of the first inverter portion/high voltage converter portion B1 is connected to a first change-over contact of a fifth switch 5. Also, one output end of the second inverter portion/high voltage converter portion B2 is connected to a second change-over contact of the fourth switch 4, and the other output end of the second inverter portion/high voltage converter portion B2 is connected to a second change-over contact of the fifth switch 5. Respective stationary contacts of the fourth switch 4 and the fifth switch 5 are connected to respective electrodes of the X-ray tube 110.

Then, an operation of the X-ray high voltage generator according to the second embodiment will be explained hereunder.

By way of example, assume that the first switch 1, the fourth switch 4, and the fifth switch 5 are set in the state illustrated in FIG. 4 and also the X-ray high voltage generator is in use in such state. In this case, the first inverter portion/high voltage converter portion B1 is in operation and then X-rays are irradiated from the X-ray tube 110 to the patient (not shown).

If there is trouble in any one of the inverter circuit 104, the high voltage transformer 107, the high voltage rectifier 108, and the high voltage capacitor 109 constituting the first inverter portion/high voltage converter portion B1, a variation in a detection current flowing through the inverter current detector 106 or a variation in a detection voltage across the voltage dividing resistor 111 is caused. In compliance with such detection current or detection voltage, the inverter driving circuit 112 which serves as one constituent element of an abnormality detecting means may decide that any trouble is caused. According to this decision result, the inverter driving circuit 112 operates the first switch 1, the fourth switch 4, and the fifth switch 5 to switch the connection to the second inverter portion/high voltage converter portion B2. In response to this switching, a predetermined tube voltage is applied to the X-ray tube 110 via the second inverter portion/high voltage converter portion B2.

Figure 5:
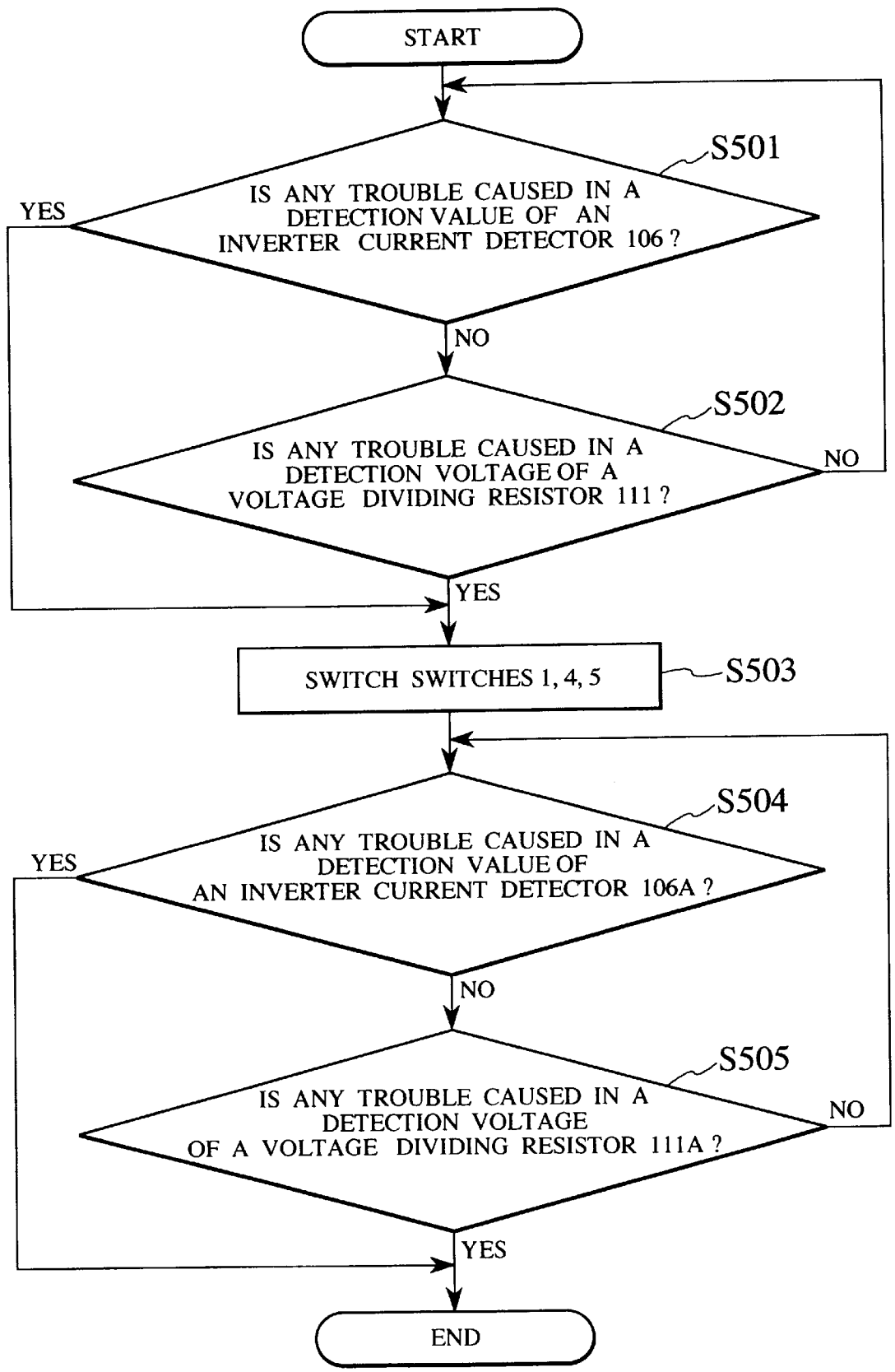
FIG. 5 is a flowchart illustrative of switching operation procedures in the second embodiment of the present invention.

More particularly, switching operation procedures in the second embodiment of the present invention are shown in FIG. 5 as a flowchart. First of all, if there is any abnormality in the detection value of the inverter current detector 106 in operation of the first inverter portion/high voltage converter portion B1 (step 501), the process proceeds to step 503 to switch the first switch 1, the fourth switch 4, and the fifth switch 5 therein so as to operate the second inverter portion/high voltage converter portion B2. If there is no abnormality in the detection value of the inverter current detector 106, but there is any abnormality in the detection voltage detected by the voltage dividing resistor 111 (step 502), the first switch 1, the fourth switch 4, and the fifth switch 5 are also switched to operate the second inverter portion/high voltage converter portion B2 (step 503). Then, if any abnormality occurs in the detection value of the inverter current detector 106A in operation of the second inverter portion/high voltage converter portion B2 (step 504), the X-ray high voltage generator stops its operation. If there is no abnormality in the detection value of the inverter current detector 106A, but there is any abnormality in the detection voltage detected by the voltage dividing resistor 111A (step 505), the X-ray high voltage generator stops its operation.

In this manner, even if the X-ray high voltage generator has trouble in the first inverter portion/high voltage converter portion B1, such trouble can be detected so that the connection can be switched immediately from the first inverter portion/high voltage converter portion B1 to the second inverter portion/high voltage converter portion B2. Therefore, X-ray exposure from the X-ray tube 110 to the patient is never interrupted and thus such trouble exerts no unfavorable influence on the patient.

(3) Third Embodiment

In the above second embodiment, the first inverter portion/high voltage converter portion is connected in parallel with the second inverter portion/high voltage converter portion via the switches and, if any trouble is caused in the first inverter portion/high voltage converter portion B1 in use, the second inverter portion/high voltage converter portion B2 is operated. In contrast, in the third embodiment, two inverter portions/high voltage converter portions are connected in parallel with each other without using the switch.

Figure 6:
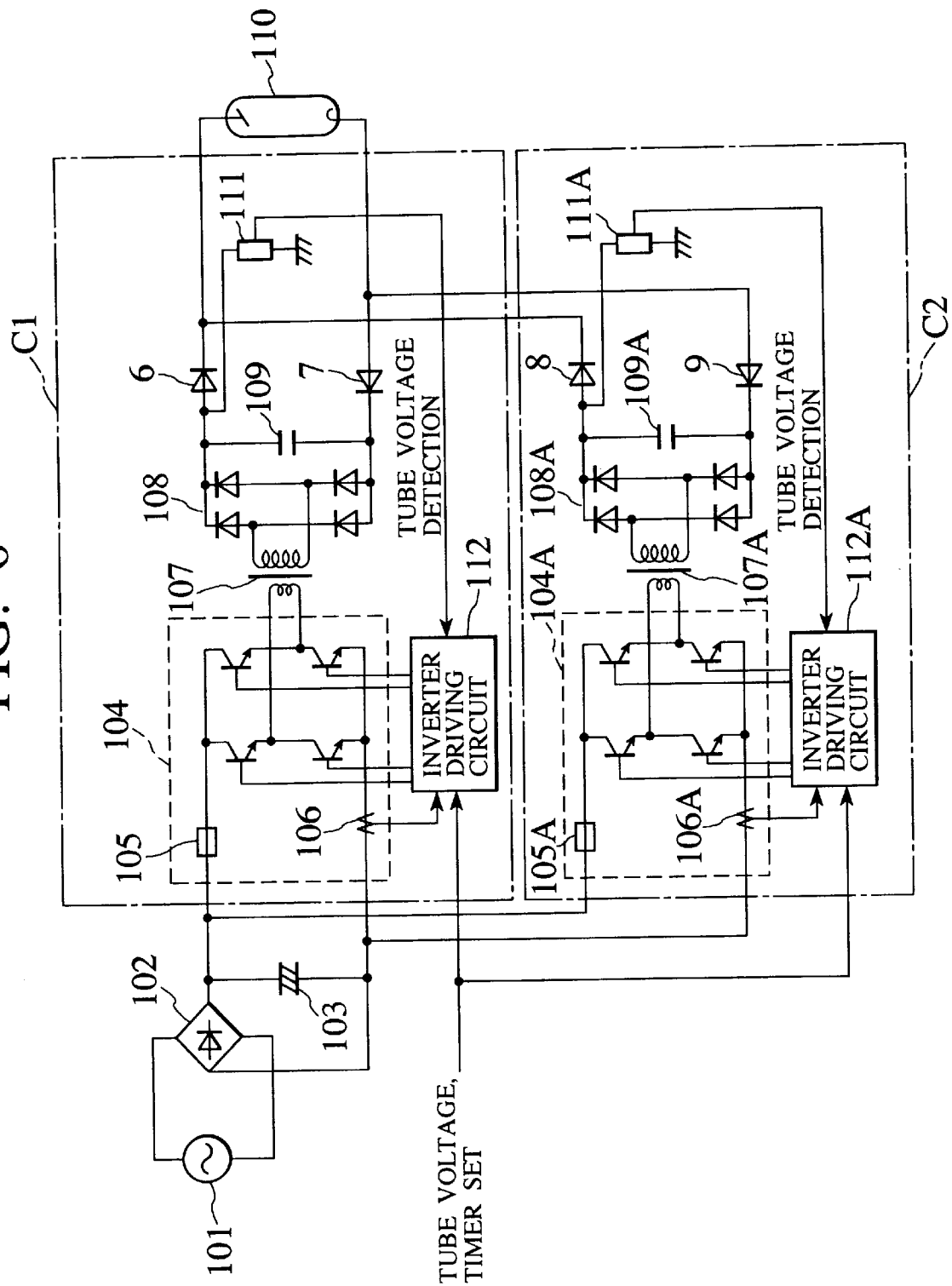
FIG. 6 is a block circuit diagram showing an X-ray high voltage generator according to a third embodiment of the present invention.

FIG. 6 is a block circuit diagram showing an X-ray high voltage generator according to the third embodiment of the present invention.

Differences between the second embodiment and the third embodiment reside in that a first inverter portion/high voltage converter portion C1 and a second inverter portion/high voltage converter portion C2 are directly connected to each other by eliminating the first switch 1, the fourth switch 4, and the fifth switch 5 in the third embodiment and that reverse-current blocking high voltage diodes 6, 7 are inserted between the high voltage capacitor 109 and the X-ray tube 110 and also reverse-current blocking high voltage diodes 8, 9 are inserted between the high voltage capacitor 109A and the X-ray tube 110.

Subsequently, an operation of the X-ray high voltage generator according to the third embodiment will be explained hereunder.

For example, assume that only the first inverter portion/high voltage converter portion C1 is driven by controlling the inverter driving circuit 112 and the second inverter portion/high voltage converter portion C2 is ceased by controlling the inverter driving circuit 112A. Under this condition, X-ray exposure can be handled by the physician in charge.

If any trouble is caused in any one of the inverter circuit 104, the high voltage transformer 107, the high voltage rectifier 108, and the high voltage capacitor 109 constituting the first inverter portion/high voltage converter portion C1, a detection current flowing through the inverter current detector 106 or a detection voltage across the voltage dividing resistor 111 is varied. Hence, according to such detection current or detection voltage, the inverter driving circuit 112 which serves as one constituent element of abnormality detecting means may decide that any trouble is caused. According to this decision result, the inverter driving circuit 112 operates to functionally switch the connection to the second inverter portion/high voltage converter portion C2 side. In response to this switching, a predetermined tube voltage is applied to the X-ray tube 110 via the second inverter portion/high voltage converter portion C2.

Like the above, even though the X-ray high voltage generator has trouble in the first inverter portion/high voltage converter portion C1, such trouble can be detected so that the connection can be switched immediately from the first inverter portion/high voltage converter portion C1 to the second inverter portion/high voltage converter portion C2. Therefore, X-ray exposure from the X-ray tube 110 to the patient is by no means interrupted and thus such trouble exerts no bad influence upon the patient.

(4) Fourth Embodiment

The fourth embodiment is that the inverter driving circuit is commonly used in the third embodiment.

Figure 7:
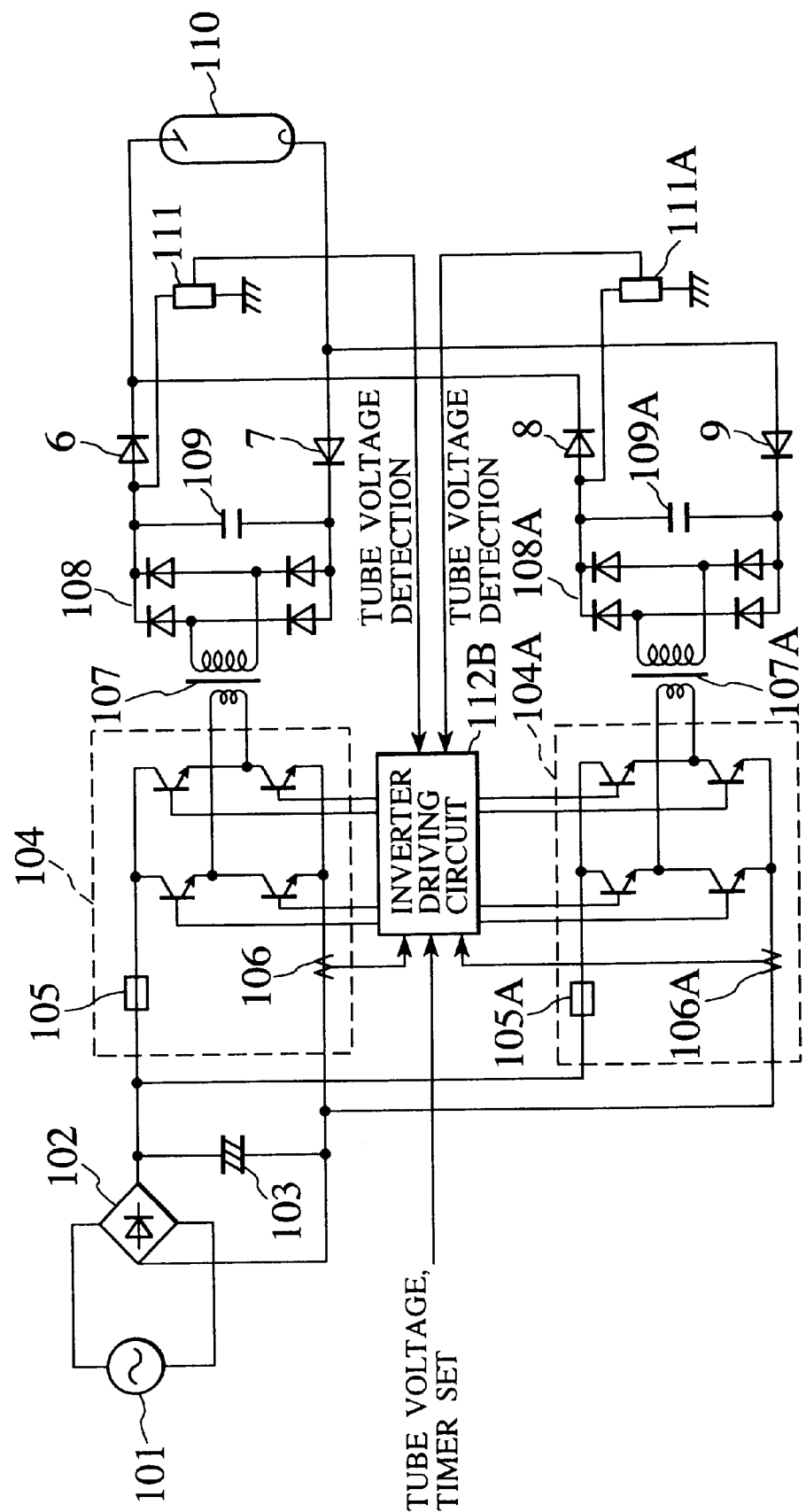
FIG. 7 is a block circuit diagram showing an X-ray high voltage generator according to a fourth embodiment of the present invention.

FIG. 7 is a block circuit diagram showing an X-ray high voltage generator according to a fourth embodiment of the present invention.

An operation of the X-ray high voltage generator according to the fourth embodiment will be explained hereunder. As operation modes of the fourth embodiment, there are a) a first operation mode wherein a first system (104, 107, 108, 6, 7, etc.) is in use while a second system (104A, 107A, 108A, 8, 9, etc.) is used as a reserve system, and b) a second operation mode wherein the first system and the second system are used at the same time.

a) First operation mode

Under control of the inverter driving circuit 112B, only the first system is driven and the second system is not driven. In this condition, X-ray exposure can be handled by the surgeon.

If any trouble is caused in the inverter circuit 104, the high voltage transformer 107, the high voltage rectifier 108 or the high voltage capacitor 109, which constitutes the first system, the detection current detected by the inverter current detector 106 or the detection voltage detected by the voltage dividing resistor 111 is varied correspondingly. In response to such detection current or detection voltage, the inverter driving circuit 112B serving as a constituent element of abnormality detecting means may decide that any trouble is caused in the first system. According to this decision result, the inverter driving circuit 112B can functionally switch the connection from the first system to the second system. Because of this switching, a predetermined tube voltage is applied to the X-ray tube 110 via the second system.

As stated above, even if the first system is broken down, the failure can be detected immediately to thus switch the connection from the first system to the second system. Hence, X-ray exposure from the X-ray tube 110 to the patient is never interrupted and thus the patient is never subjected to the harmful damage.

b) Second operation mode

Under control of the inverter driving circuit 112B, the first system and the second system are operated simultaneously to irradiate X-ray from the X-ray tube 110 to the patient.

In this manner, since loads imposed on the first system and the second system can be reduced to half respectively, life time of the inverter circuits and the high voltage converter circuits can be lengthened.

In addition, if a requisite output is generated by operating the first system and the second system simultaneously and further any trouble is caused in the inverter circuit, the high voltage transformer, the high voltage rectifier, the high voltage capacitor, or the like in either system, the inverter driving circuit 112B will control the remaining system to generate the same output. Alternatively, if the same output capacity as obtained by two systems before failure cannot be achieved by one system only, an operation of the X-ray high voltage generator is still continued with reduced output.

As discussed above, according to the present invention, the X-ray high voltage generator is constituted such that the second system is connected in parallel with the first system composed of the inverter portion, the high voltage conversion portion, etc. and that, if there is anything abnormal about the current and the voltage applied to one system, the other system can be operated. Therefore, if one system is broken down, for example, exposure of the X-ray tube can be continued by the use of the other system so that a safety of the patient in operation can be assured.

It should be understood that many modifications and adaptations of the invention will become apparent to those skilled in the art and it is intended to encompass such obvious modifications and changes in the scope of the claims appended hereto.

What is claimed is:

1. An X-ray high voltage generator comprising:
   a rectifying/smoothing circuit for rectifying/smoothing an alternating current supplied from an alternating current power supply to convert the alternating current into a direct current;
   a first inverter circuit for converting the direct current supplied from the rectifying/smoothing circuit into a high frequency alternating current;
   first inverter driving means for controlling the first inverter circuit;
   a second inverter circuit for converting the direct current supplied from the rectifying/smoothing circuit into a high frequency alternating current;
   second inverter driving means for controlling the second inverter circuit;
   a transformer for increasing a high frequency alternating current voltage output supplied from the first inverter circuit or the second inverter circuit;
   a rectifier for rectifying an output of the transformer and supplying it to an X-ray tube;
   a first abnormality detecting means for detecting an electric current flowing through the first inverter circuit;
   a second abnormality detecting means for detecting an output voltage of the rectifier; and
   switching means for disconnecting the transformer from the first inverter circuit and connecting the transformer to the second inverter circuit when the first abnormality detecting means detects an abnormality of the detected electric current or when the second abnormality detecting means detects an abnormality of the detected output voltage.

2. An X-ray high voltage generator according to claim 1, wherein the switching means includes a switch for connecting the transformer to the first inverter circuit or the second inverter circuit.

3. An X-ray high voltage generator comprising:
   a rectifying/smoothing circuit for rectifying/smoothing an alternating current supplied from an alternating current power supply to convert the alternating current into a direct current;
   a first DC/AC converting portion including a first inverter circuit for converting the direct current supplied from the rectifying/smoothing circuit into a high frequency alternating current, first inverter driving means for controlling the first inverter circuit, a first transformer for increasing a high frequency alternating current voltage output supplied from the first inverter circuit, and a first rectifier for rectifying an output of the first transformer and supplying the rectified output to an X-ray tube;
   a second DC/AC converting portion including a second inverter circuit for converting the direct current supplied from the rectifying/smoothing circuit into a high frequency alternating current, second inverter driving means for controlling the second inverter circuit, a second transformer for increasing a high frequency alternating current voltage output supplied from the second inverter circuit, and a second rectifier for rectifying an output of the second transformer and supplying rectified output to the X-ray tube;
   an abnormality detecting means including at least one of a current detecting means for detecting an electric current flowing through the first inverter circuit and a voltage detecting means for detecting an output voltage of the first rectifier; and
   switching means for disconnecting the X-ray tube from the first DC/AC converting portion and connecting the X-ray tube to the second DC/AC converting portion when the abnormality detecting means detects an abnormality of the detected electric current or abnormality of the detected output voltage.

4. An X-ray high voltage generator according to claim 3, wherein the switching means includes a switch for connecting the X-ray tube to the first DC/AC converting portion or the second DC/AC converting portion.

5. An X-ray high voltage generator according to claim 3, further comprising first reverse-current blocking high voltage diodes between the first rectifier and the X-ray tube and second reverse-current blocking high voltage diodes between the second rectifier and the X-ray tube.

6. An X-ray high voltage generator comprising:

a rectifying/smoothing circuit for rectifying/smoothing an alternating current supplied from an alternating current power supply to convert the alternating current into a direct current;

a first DC/AC converting portion including a first inverter circuit for converting the direct current supplied from the rectifying/smoothing circuit into a high frequency alternating current, a first transformer for increasing a high frequency alternating current voltage output supplied from the first inverter circuit, and a first rectifier for rectifying an output of the first transformer and supplying the rectified output to an X-ray tube;

a second DC/AC converting portion including a second inverter circuit for converting the direct current supplied from the rectifying/smoothing circuit into a high frequency alternating current, a second transformer for increasing a high frequency alternating current voltage output supplied from the second inverter circuit, and a second rectifier for rectifying an output of the second transformer and supplying the rectified output to the X-ray tube;

an abnormality detecting means including at least one of a current detecting means for detecting an electric current flowing through the first inverter circuit and a voltage detecting means for detecting an output voltage of the first rectifier; and inverter drive controlling means for controlling the first and second inverters and for setting the first DC/AC converting portion inactive and setting the second DC/AC converting portion active when the abnormality detecting means detects an abnormality of the detected electric circuit or abnormality of the detected output voltage.

* * * * *